United States Patent [19]

Melzi

[11] Patent Number: 4,909,045
[45] Date of Patent: Mar. 20, 1990

[54] HIGH-EFFICIENCY HEATING UNIT FOR PRODUCING HOT WATER

[75] Inventor: Omar Melzi, Bergamo, Italy

[73] Assignee: Italclimas Srl, Verona, Italy

[21] Appl. No.: 96,501

[22] Filed: Sep. 15, 1987

[30] Foreign Application Priority Data

Sep. 15, 1986 [IT] Italy .................. 84944 A/86

[51] Int. Cl.⁴ ............................................. F25B 27/00
[52] U.S. Cl. .................. 62/238.6; 62/235.1;
165/61; 237/2 B
[58] Field of Search ........... 237/2 B; 62/238.6, 235.1;
165/61

[56] References Cited

U.S. PATENT DOCUMENTS 4,235,369 11/1980 Huber .................... 237/2 B
4,524,909 6/1985 Persson .................. 237/2 B

*Primary Examiner*—Henry A. Bennet
*Attorney, Agent, or Firm*—Birch, Stewart, Kolasch & Birch

[57] ABSTRACT

High-efficiency heating unit for producing hot water, which includes in combination a heat pump which exploits the thermal energy of the sun and/or that of the environmental air for heating water or for producing sanitary water, namely warm water, and an electric burner or boiler for possible supplementary heating of the heated water or water preheated by the heat pump and designed either to be supplied to a heating system or for sanitary use.

7 Claims, 3 Drawing Sheets

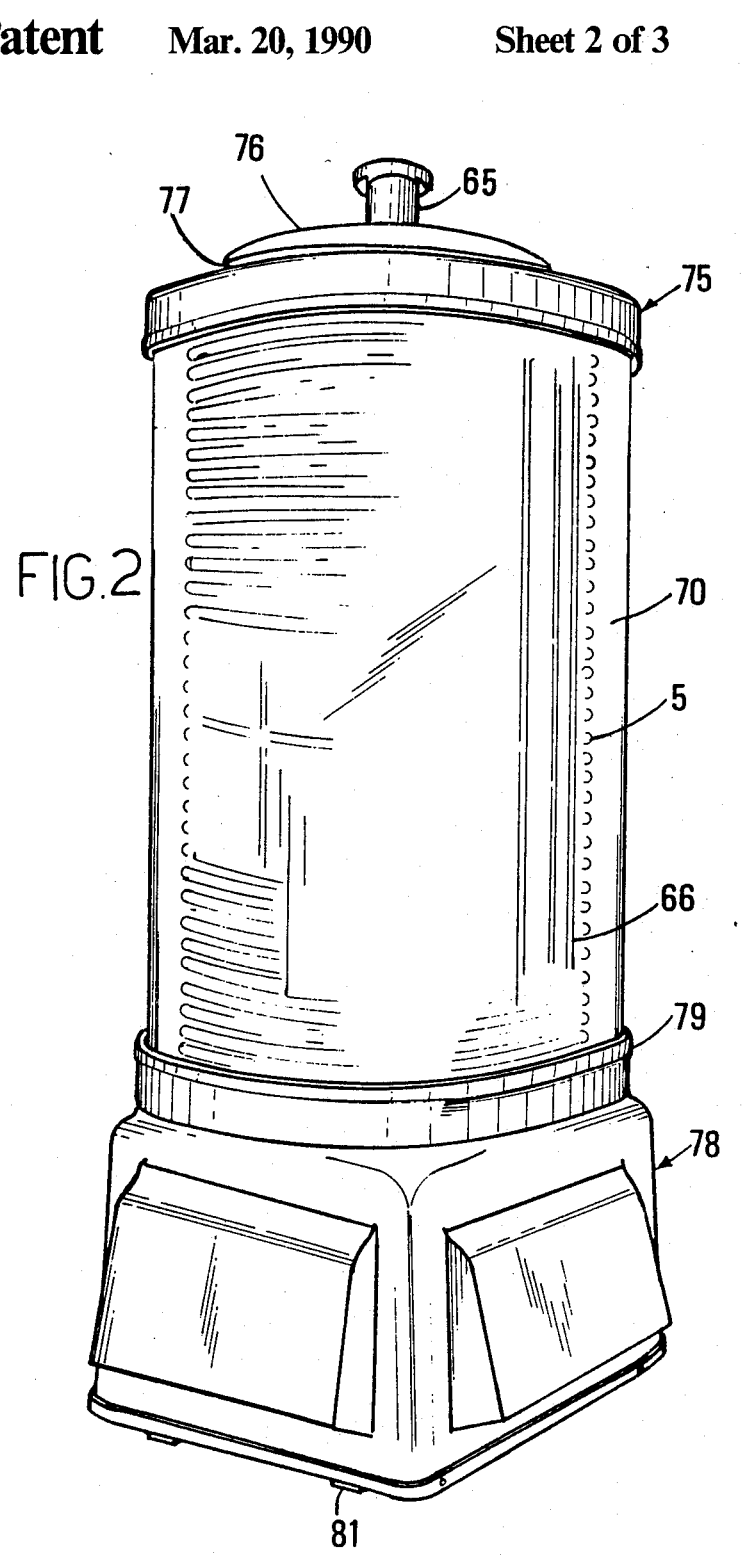

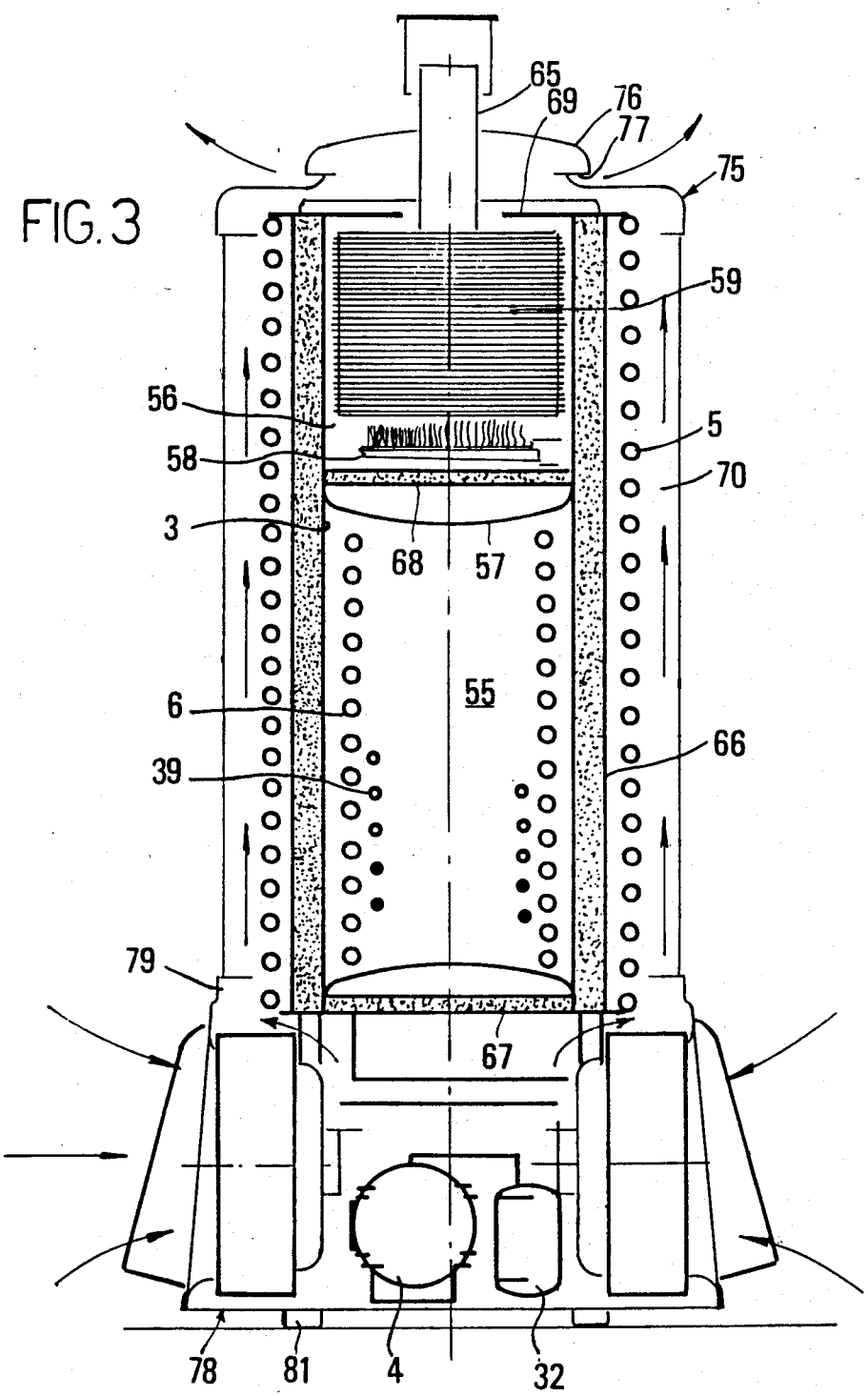

HIGH-EFFICIENCY HEATING UNIT FOR PRODUCING HOT WATER

The present invention relates to a high-efficiency heating unit for producing hot water.

Outdoor hot water generators suitable for exploiting solar radiation striking the exposed generator surface have already been proposed. Such generators can have good performance only with prolonged isolation but their efficiency drops considerable under adverse atmospheric or meteorological conditions. Thus, such generators have been used as single groups for the production of sanitary water mostly during good isolation periods. However, users had to use an outdoor sanitary water generator during the hot season and a conventional indoor heating unit for producing hot water to be used during cold periods for their heating system.

Apart from economic considerations on the entity of capital investment for two separate generator groups, suggested solutions up to now have not been suitable for fully taking advantage, at least during the cold season, of the environmental heat resources which are not at all negligible.

The present invention is directed at eliminating or drastically reducing the above drawbacks for the benefit of the economy and a more rational use of environmental heat resources.

According to the present invention there is provided a high-efficiency heating unit for producing hot water which includes in combination at least one heat pump having a motor-driven compressor for a heat conveying fluid, a solar evaporator which is contacted, in use, by environmental air, a condenser for the heat conveying fluid and a fluid expansion valve, an electric or fuel fired boiler and a water tank for supplying the boiler with hot water and in which the condenser(s) of each heat pump is immersed in heat-transfer relationship.

Further aspects and advantages of the present invention will be better understood from the following detailed description of its principle of operation and of a preferred, but not exclusive, embodiment thereof illustrated by way of non limitative example in the accompanying drawings, in which:

FIG. 2 is a perspective view of an embodiment of a heating unit according to the present invention;

FIG. 3 shows a diagrammatic vertical axial section view of the heating unit of FIG. 2.

Figure 4:
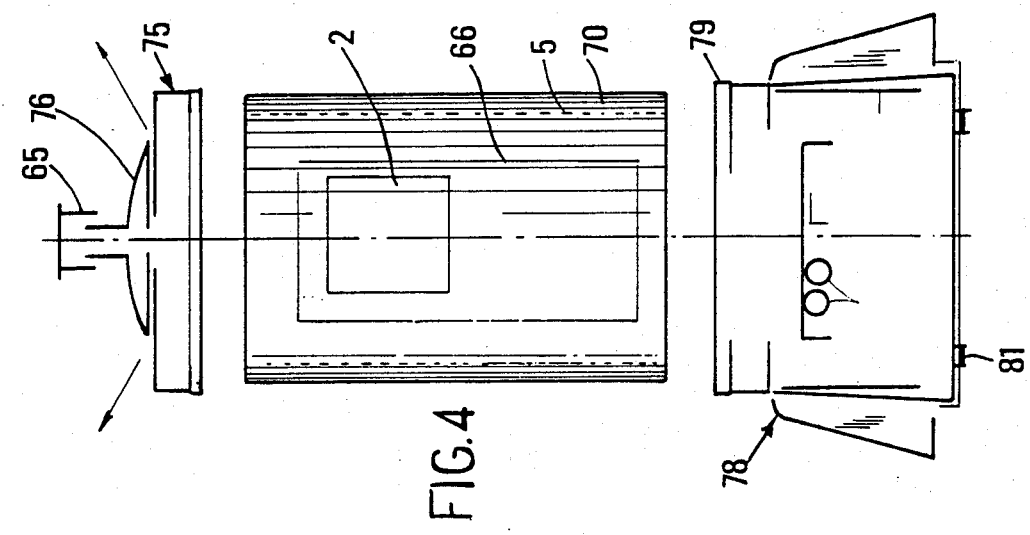
FIG. 4 shows a diagrammatic exploded view of the heating unit of FIGS. 2 and 3.
Figure 1:
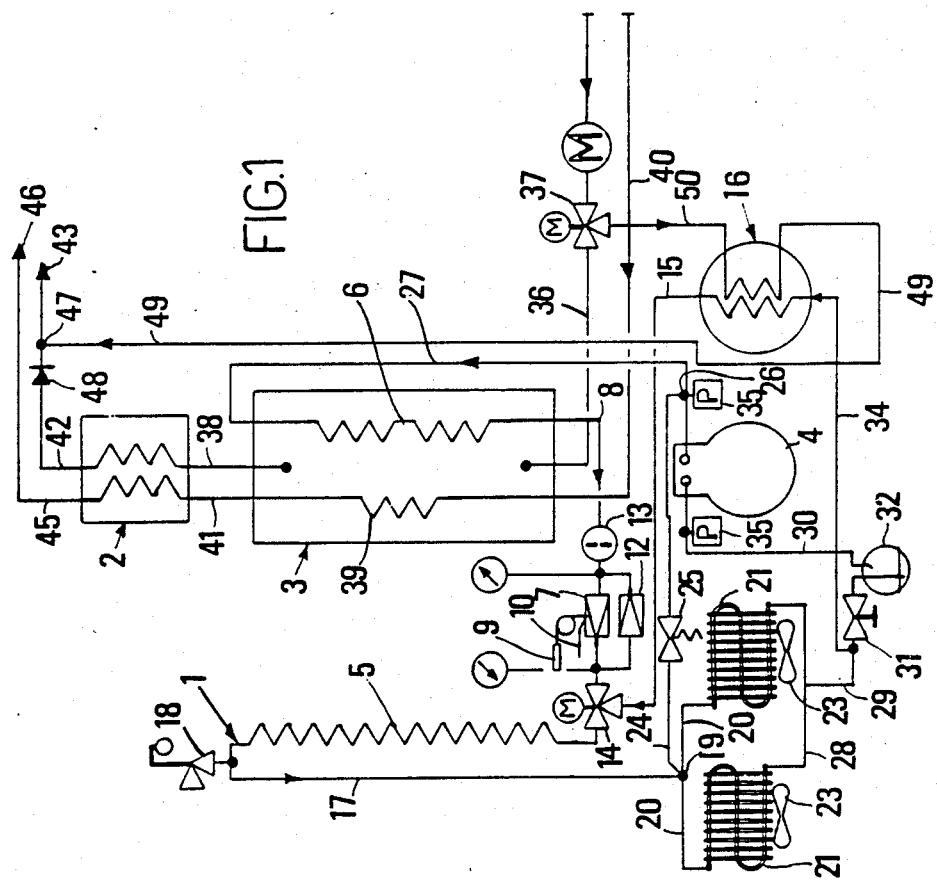
FIG. 1 shows a schematic view illustrating the components and the operation of a heating unit according to the present invention.

With reference to the drawings in which the same or similar components have been indicated with the same reference numerals, a heating unit according to the present invention essentially comprises a heat pump generally indicated as 1, an electric or fuel fired boiler 2 and a water storage system 3.

The heat pump 1 comprises a motor-driven compressor 4 designed to compress a heat conveying fluid such as Freon, a solar evaporator 5 which is placed upstream of the compressor and, in use, can be exposed to and contacted by a surrounding air flow; a condenser 6 for the fluid, placed downstream of the compressor and constituted by a fluidwater heat exchanger placed in the tank 3, as well as an expansion valve 7 inserted on a pipe 8 which connects the condenser 6 to the evaporator 5.

Advantageously, the laminar or expansion valve 7 can be controlled by a thermostatic sensor 9 and a pressostatic sensor 10. Furthermore, the valve 7 is preferably bypassed by a safety valve 12. On the pipe 8 a dehydration filter 13 for the heat conveying fluid can be provided upstream of the expansion valve 7 and the safety valve 12.

At the inlet of the evaporator 5 a three-way valve 14 is provided, which is connected to the pipe 8, the evaporator 5 and a pipe 15 from an auxiliary heat exchanger 16, that will be described further on. The evaporator outlet 5 communicates with a pipe 17 on which a safety valve 18 can be placed. Pipe 17 branches out at 19 into one or more sections 20, each leading to a respective air-fluid heat exchanger 21 which is arranged to receive air blown in from one or a respective fan 23, and in a section 24 in which a check valve 25 is provided. The arrangement is such that the air blown in by the fan or fans 23, passes through the heat exchanger 21 and hits the solar evaporator 5. Pipe 24 communicates at 26 with the outlet pipe 27 of the compressor 4, whereas the outlets 28 of the heat exchangers 21 join into a pipe 29 which, before reaching the compressor inlet 30, can lead to an on-off valve 31 and a liquid separator 32, connected in series. Upstream of the valve 31 of the pipe 29 a section 34 branches off which supplies heat-conveying fluid to the heat exchanger 16.

For safety reasons, the compressor 4 can have a pressure switch 35 both at its inlet and outlet 27. The latter reaches the top of the tank 3 to feed the condenser-heat exchanger 6.

Tank 3 is coated with one or more layers of insulating material, such as foamed polystyrene. Advantageously tank 3 can be enclosed in a jacket which limits a chamber for the insulating material. Tank 3 is fed with water, e.g. by a heating system, through an inlet duct 36 on which a three-way valve 37 is provided and stored up water is let off through an outlet duct 38 which supplied a first inlet of the boiler.

In tank 3 there is also a water-to-water heat exchanger 39 which receives water from a water system through a duct 40 and supplies a second inlet of the boiler through a tube 41.

The boiler 2 can be a conventional hot water generator, e.g. a gas boiler, an oil-fired boiler, an electric boiler, or any other suitable generator. The generator or boiler 2 can be controlled by control means, such as a thermostat (not shown), which sets the generator in operation only if the temperature of the water coming from one of the ducts 38 or 41 is lower than a predetermined threshold level. Generator 2 has two outlets. An outlet 42, which discharges water supplied to the generator through its inlet pipe 38 and is connected to the delivery of a heating system, and the other outlet 45 which, for example, discharges water from the inlet 41 and is connected to the inlet 46 of a sanitary water distribution system. Advantageously, from the outlet 42 downstream of a check valve 48 a tube 49 branches off at a point 47 and is connected to the heat exchanger 16 arranged for conditioning or anyway for auxiliary purposes. The outlet connected to tube 49 of the heat exchanger 16 leads to the three-way manual valve 37 through the pipe 50.

The operation of the heating unit described above is as follows. Once the motor of the compressor 4 has been connected to the main circuit and the necessary hydraulic connections made, water in the tank 3 heats up owing to the heat pump (heat exchanger 6). During the hot season the heat pump also heats up the cold water which passes through the heat exchanger 39 and is fed into inlet 46. Should the water temperature in the duct 41 not reach a predetermined threshold level, the generator or boiler 2 is activated for supplying individual heat to it and raising its temperature.

During the cold season the tank 3 can also act as a plenum chamber for the water of the heating system. Warm water from the tank 3 through the outlet 38 is heated up to a suitable temperature, e.g. 50°–80° C., by the generator 2, before being discharged through the outlet 42, i.e. mainly to the heating system from where it returns through pipe 36 and valve 37 and possibly partly through the heat exchanger 16.

During the hot season the heat exchanger 16 can act as a air conditioner or cold source for any water coming from the heating system recirculated through the valve 37, since the heat conveying fluid of the heat pump will remove heat from the heat exchanger 16, and thus water passing through the pipe 49 and fed to the heating system is colder than the water fed to the heat exchanger 16.

FIGS. 2 to 4 show a practical embodiment of the invention in which the tank 3 is cylindrical in shape and is divided, by a top sealing partition 57, into two compartments, a lower compartment 55 and a higher compartment 56. The compartment 55 acts as a water storage tank and accommodates the condenser 6 and the heat exchanger 39, whereas the upper compartment 56 receives the generator 2, e.g. comprising a gas burner 58 and a boiler 59 arranged above it. On top of the compartment 56 extends a stack 65 for discharging the burner flue gases. The tank 3 is laterally and externally wrapped throughout its length in an insulating jacket 66. On the bottom of the compartment 55 insulation is provided by a false bottom 67, whereas a second insulating partition 68 is provided on the top underneath the burner 58, but external to the partition 57. In this way the compartment 56 is also thermally insulated except on its top where it is at least partly closed by a cap 69 through which the stack 65 extends.

The outer surface of the jacket 66 is preferably chromium plated and uneven or rough for a more efficient reflection of solar light. Around such a surface, there is spirally wound the solar evaporator 5 which can thus absorb by reflection and conduction most of the heat gained by the jacket 66. At a certain distance around the evaporator 5 an external transparent cylinder is provided, e.g. made of plexiglass which, with jacket 66 and coil 5, delimits an annular gap or tunnel 70 which provides a greenhouse effect and is closed on its top by means of a lid 75, e.g. made of fibreglass, bearing a small dome 76 under which outlet slits 77 are provided.

The tank 3 rests on a base 78, e.g. having a roughly truncated pyramidal shape, which also supports a fibreglass ring for supporting the transparent cylinder 70 and encloses and houses the remaining components of the heating unit, that is to say the compressor 4, the separator 32, the two fans 23 and the heat exchangers or dynamic evaporators 21, suitably arranged one opposite the other to create a rising air flow through the gap or tunnel 70, as well as all the other electrical parts or their respective controls 80. The control instruments are advantageously protected by a transparent lid. The base 78 can rest on small legs 81.

With the above described arrangement the solar evaporator 5 is positively assisted, during the cold season, by the air flow fed in from outside by the fans 23. Such air flow passes throughout the heat exchangers 21, is forced through tunnel 70 and flows onto the relatively large exposed surface of the evaporator to which it can give off heat before being discharged through the slits 77 under the domed lid 75. If desired, the air current through tunnel 70 can also act as a cooling medium which can be exploited according to user's needs.

As one can appreciate, a heating unit according to the present invention actually meets the requirements of providing a very high energy savings in the production of hot water and for domestic and industrial heating. Moreover, such a unit is extremely versatile since it can provide hot water for a heating system or sanitary water for a building or act as a conditioner-refrigerator arranged to feed a heating system with water at a lower temperature than that of the environment. Materials and dimensions can vary according to requirements.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

I claim:
1. A high efficiency dual purpose heating/air conditioning system comprising in combination:
   at least one heat pump inclusive of a respective motor-driven compressor for a heat conveying fluid, at least one condenser for said heat-conveying fluid, a solar evaporator which, in use, can be contacted by environmental air, an expansion valve for said heat-conveying fluid, and a water-to-water heat exchanger,
   a boiler,
   a water storage tank designed to supply said boiler with heated water, said at least one heat-conveying fluid condenser and said water-to-water heat exchanger being immersed in water in said water storage tank, juxtapositioned to each other and in a heat-transfer relationship with said water, said heat exchanger receiving cold water which is preheated by absorbing heat from said water in said storage tank before being conveyed to said boiler, and
   an auxiliary water-fluid heat exchanger arranged between said solar evaporator of said at least one heat pump and said water storage tank so as to heat said heat conveying fluid before being supplied to said solar evaporator by absorbing heat from recirculated heated water from said boiler, simultaneously producing cooled water from said auxiliary heat exchanger for air conditioning.

2. A heating unit as in claim 1, wherein said boiler has a first water inlet from said storage tank and a first water outlet for discharging hot water, a second water inlet connected to said water-to-water heat exchanger and a second water outlet for discharging sanitary water.

3. A heating unit as in claim 1, further including control means acting in response to water temperature at one or both outlets of said boiler, thereby setting said boiler in operation when the water temperature is lower than a predetermined threshold level.

4. A heating unit as in claim 1, wherein said evaporator is placed in, and separated from, a transparent casing which together with said evaporator delimits a gap or tunnel in which a greenhouse effect is formed during isolation hours and through which environmental air can flow.

5. A heating unit as in claim 4, further including at least one fan for forcing environmental air through said gap or tunnel.

6. A heating unit as in claim 5, further including at least one air-fluid exchanger between said heat-conveying fluid and air, arranged upstream of said compressor and through which said at least one fan causes air to flow before reaching said gap or tunnel.

7. A heating unit as in claim 1, wherein said evaporator is arranged on an insulating cover of said storage tank and said casing accommodates and envelopes both said tank and said evaporator and includes at the top thereof a protection cap for discharging air from said gap or tunnel.

* * * * *